(12) United States Patent
Wang et al.

(10) Patent No.: US 6,293,148 B1
(45) Date of Patent: Sep. 25, 2001

(54) STRUCTURAL DESIGN FOR IMPROVING THE SENSITIVITY OF A SURFACE-MICROMACHINED VIBRATORY GYROSCOPE

(75) Inventors: Zhe Wang; Uppili Sridhar; Rong Ming Lin; Mong King Lim, all of Singapore (SG)

(73) Assignee: Institute of Microelectronics, Singapore (SG)

(*) Notice: Subject to any disclaimer, the term of this patent is extended or adjusted under 35 U.S.C. 154(b) by 0 days.

(21) Appl. No.: 09/453,112

(22) Filed: Dec. 2, 1999

(30) Foreign Application Priority Data

Apr. 30, 1999 (SG) .................................. 9901912-7

(51) Int. Cl.[7] .............................. G01P 9/04; G01C 19/56
(52) U.S. Cl. ...................................... 73/504.02; 73/504.12
(58) Field of Search .......................... 73/504.12, 504.02, 73/504.14, 504.15, 504.16, 574.32

(56) References Cited

U.S. PATENT DOCUMENTS

| | | | |
|---|---|---|---|
| 5,392,650 | 2/1995 | O'Brien et al. | 73/517 A |
| 5,780,740 | * 7/1998 | Lee et al. | 73/504.12 |
| 5,895,850 | * 4/1999 | Buestgens | 73/504.12 |
| 5,979,246 | * 11/1999 | VanCleve et al. | 73/861.357 |
| 6,067,858 | * 5/2000 | Clark et al. | 73/504.16 |

FOREIGN PATENT DOCUMENTS

| | | |
|---|---|---|
| WO915323A1 | 5/1999 | (EP) . |
| WO96/24652 | 9/1995 | (WO) . |
| WO95/34798 | 12/1995 | (WO) . |
| WO96/05480 | 2/1996 | (WO) . |
| WO97/45699 | 12/1997 | (WO) . |

OTHER PUBLICATIONS

Park, et al., Laterally Oscillated and Force–Balanced Micro Vibratory Rate Gyroscope Supported by Fish–Hook–shaped Springs, Sensors and Actuators, A–64 (1998) 69–75.

Oh, et al., A Tunable Vibratory Microgyroscope, Sensors and Actuators A64 (1998) 51–55.

Clark, et al., Surface Micromachined Z–Axis Vibratory Rate Gyroscope, Solid State Sensor and Actuator Workshop, Hilton Head, South Carolina, Jun. 2–6, 1996.

\* cited by examiner

Primary Examiner—Helen Kwok
(74) Attorney, Agent, or Firm—Jones, Day, Reavis & Pogue

(57) ABSTRACT

The present invention is a motion sensor apparatus for use as a general mechanical amplifier, a gyroscope, or other resonant sensor such as an accelerometer. In accordance with the invention, the motion sensor apparatus includes a primary mass and a primary flexure structure. The primary flexure structure supports the primary mass to experience driven motion against a bias of the primary flexure structure. The apparatus further includes a secondary mass which is less massive than the primary mass. A secondary flexure structure interconnects the secondary mass with the primary mass, and supports the secondary mass to experience sensing motion relative to the primary mass against a bias of the secondary flexure structure. The stiffness ratio between the primary and secondary flexure structures is equal to the mass ratio between the primary and secondary masses.

3 Claims, 2 Drawing Sheets

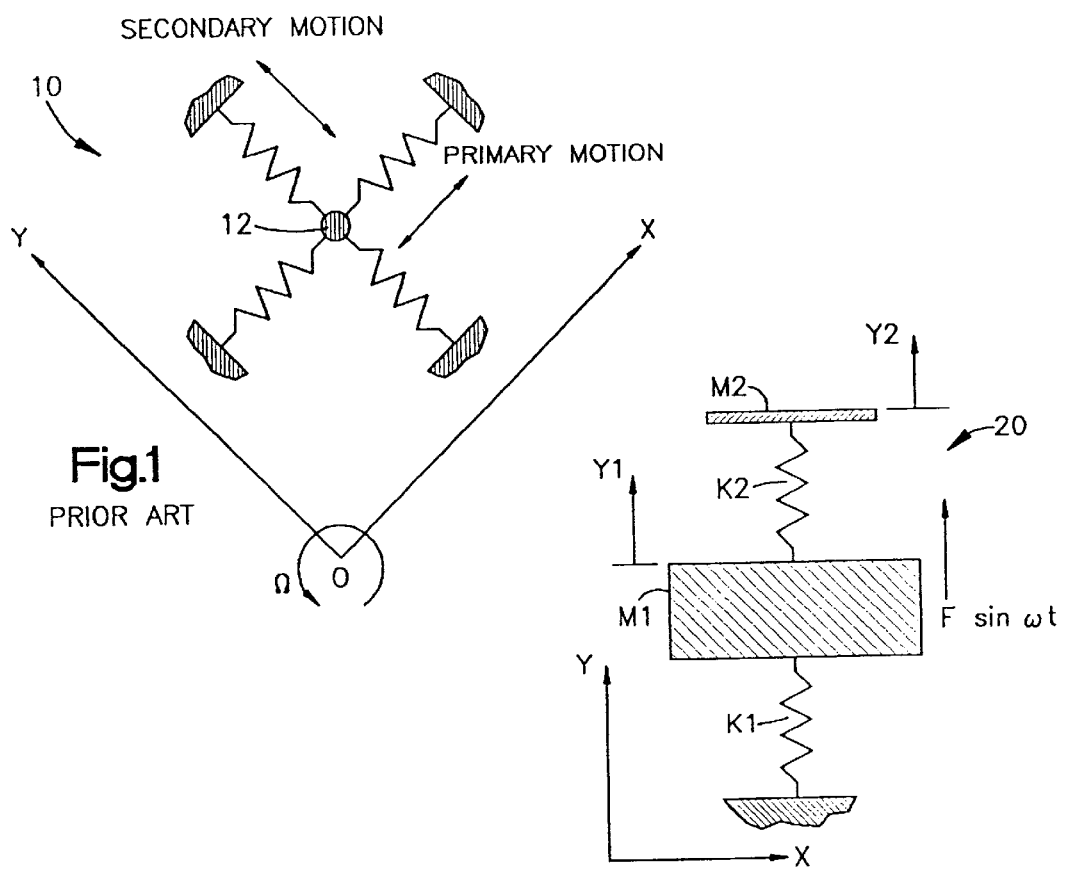
Fig.1 PRIOR ART
Fig.2
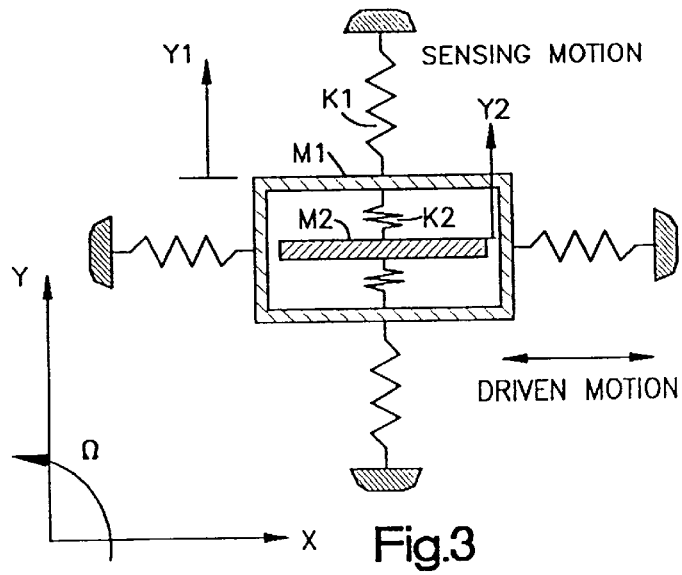
Fig.3

STRUCTURAL DESIGN FOR IMPROVING THE SENSITIVITY OF A SURFACE-MICROMACHINED VIBRATORY GYROSCOPE

BACKGROUND OF THE INVENTION

Gyroscopes or gyro rate sensors are widely used for navigation, stabilization, general rate control, pointing, autopilot systems, missile guidance control, etc. A typical example is the application of yaw rate sensors to automobiles to provide input to the control systems for suspension, braking and steering. During recent years there have been attempts to develop low cost gyroscopes suitable for mass production. A promising concept of such a device is the vibratory gyroscope which can be fabricated using surface-micromachining technology.

The basis operating principle of a vibratory gyroscope 10 is illustrated in FIG. 1. The purpose of the gyroscope 10 is to measure the angular velocity $\Omega$. To achieve this, it is first necessary to cause the particle 12 to vibrate with constant amplitude along the axis Ox. This motion is referred to as primary motion (or driven motion). When the gyroscope 10 rotates, the particle 12 experience a Coriolis inertia force. This force has a magnitude proportional to $\Omega$ and a direction along the axis Oy. In the absence of further control on the motion of the particle 12, the Coriolis force will cause the particle 12 to vibrate along the axis Oy. This motion is referred to as secondary motion (or sensing motion) and a measurement of its amplitude will provide an estimate of the angular velocity $\Omega$.

The sensitivity of such a vibratory gyroscope can be determined by:

$$S = \frac{Y_o}{\Omega} = \frac{2\omega_x X_o}{\omega_y^2 [(1-r^2)^2 + (r/Q)^2]^{1/2}}$$

Where:

Yo is the magnitude of the sensing motion;

$\Omega$ is the angular rate applied to the gyroscope;

$\omega_x$ is the excitation frequency of the driven motion in the axis Ox;

$\omega_y$ is the resonant frequency of the sensing motion in the axis Oy;

$r = \omega_x/\omega_y$; and

Q is the mechanical quality factor for the sensing motion.

It can be seen from the foregoing equation that, when $r=\omega_x/\omega_y=1$, the sensitivity can reach its maximum value, i.e., $$S = \frac{Y_o}{\Omega} = \frac{2QX_o}{\omega_y}$$

Assuming that $X_o=1$ $\mu$m, $\omega_y=\sqrt{K_y/m}=6879$ Hz and the gyro is vacuum packaged so that $Q \approx 10000$. One can get the sensitivity, $$S = \frac{Y_0}{\Omega} = 0.4627 \times 10^{-6}$$

For the input of unit angular rate, $\Omega=1$ °/s$=0.0174$ rad/s the amplitude of the sensing motion is:

$Y_o=8.07 \times 10^{-9}$ m$=8.07$ nm

It can be thus understood that the sensing motion is the secondary effect of the Coriolis force. Note that the above estimate is based on various idealizations and assumptions. In practice, the real magnitude of the sensing motion could be far below this value, e.g., a few angstroms. Such a tiny magnitude of the sensing motion presents a major difficulty in measurement, especially if the motion is detected capacitively. It is therefore necessary to seek a proper structural design so that the sensitivity of the vibratory gyroscope can be improved.

SUMMARY OF THE INVENTION

The present invention is a motion sensor apparatus for use as a general mechanical amplifier a gyroscope, or other resonant sensor such as an accelerometer. In accordance with the invention, the motion sensor apparatus includes a primary mass and a primary flexure structure. The primary flexure structure supports the primary mass to experience driven motion against a bias of the primary flexure structure. The apparatus further includes a secondary mass which is less massive than the primary mass. A secondary flexure structure interconnects the secondary mass with the primary mass, and supports the secondary mass to experience sensing motion relative to the primary mass against a bias of the secondary flexure structure. The stiffness ratio between the primary and secondary flexure structures is equal to the mass ratio between the primary and secondary masses.

BRIEF DESCRIPTION OF THE DRAWINGS

FIG. 1 is a schematic view indicating the operating principle of a prior art vibratory gyroscope;

FIG. 2 is a schematic view of a simplified spring-mass model of a vibration absorber in accordance with the present invention;

FIG. 3 is a schematic view of a simplified spring-mass model of a vibratory gyroscope in accordance with the present invention;

DESCRIPTION OF THE INVENTION

The proposed structural design for magnification of sensing motion magnitude is based on the concept of a vibration absorber. FIG. 2 shows the spring-mass model 20 of a vibration absorber, where the mass $m_1$ is a primary mass and the mass $m_2$ a secondary mass.

Under the excitation of $F \sin \omega t$, the equation of motion of the vibration absorber 20 is described by:

$$\begin{bmatrix} m_1 & 0 \\ 0 & m_2 \end{bmatrix} \begin{bmatrix} \ddot{x}_1 \\ \ddot{x}_2 \end{bmatrix} + \begin{bmatrix} k_1+k_2 & -k_2 \\ -k_2 & k_2 \end{bmatrix} \begin{bmatrix} x_1 \\ x_2 \end{bmatrix} = \begin{bmatrix} F\sin\omega t \\ 0 \end{bmatrix}$$

Assume that $$\frac{k_1}{m_1} = \frac{k_2}{m_2}$$

and define $$a = \frac{m_1}{m_2}$$

It can be mathematically proven that, at resonance, the vibration amplitudes of the two masses have the following ratio, $$\frac{X_2}{X_1} = \frac{-2a}{1 \pm \sqrt{4a+1}}$$

When a >>1, $$\frac{X_2}{X_1} \approx \pm \sqrt{a}$$

It can be seen that, under the sinusoidal excitation, the higher the mass ratio a, the larger the vibration amplitude of the secondary mass $M_2$, and more energy input to the primary mass M1 by the excitation force will be transferred to the secondary mass $M_2$.

The concept of a dynamic vibration absorber can be incorporated in the design of a surface micromachined gyroscope to improve the sensitivity of such a gyroscope. FIG. 3 shows a simplified model of a proposed gyroscope 30. The mass ratio between the primary mass $M_1$ and the secondary mass $M_2$ in this example is 100.

Figure 4:
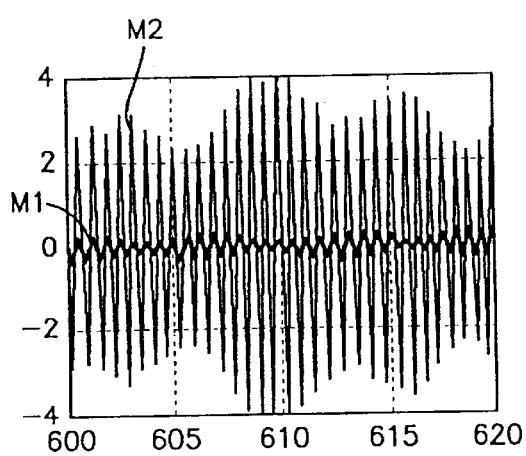
FIG. 4 is a graph representing the responses of two masses in a gyroscope in accordance with the present invention.

Given the input of 1 degree/second angular rate, the dynamic responses of the two masses $M_1$ and $M_2$ are analyzed by using MATLAB's Simulink. MATLAB is a commercial software for mathematical computing and graphing. The Simulink is a module program of MATLAB, and is used especially for simulation of electrical and mechanical systems. The excitation frequency in the x axis is 10 Hz. As shown in FIG. 4, the response amplitude of the secondary mass $M_2$ is about 10 times larger than that of the primary mass $M_1$.

Figure 5:
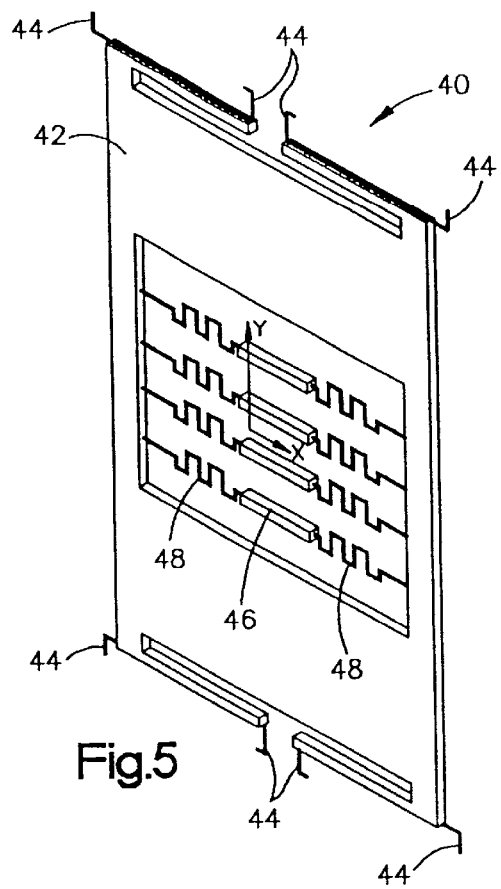
FIG. 5 is a schematic view of a finite element model of a gyroscope sensor in accordance with the present invention.

To further verify the theory behind the proposed structural design for improving gyroscope sensitivity, a gyroscope fabricable with surface micromachinlinig technology is modeled using ANSYS54 finite element code. ANSYS is a commercial finite element analysis software. It is widely used for modeling and simulation of complicated mechanical structures, coupled electromechanical systems, etc. The finite element model 40 is shown in FIG. 5.

The primary mass 42 of the gyroscope is supported by 8 crab-flexures 44. The flexures 44 are optimized in such as way that the compliance of the mass 42 in the actuation (y-axis) and sensing axis (x-axis) are almost equal but rigid in other axes. In the center of the primary mass 42, four sensing beams 46 (secondary masses) are supported with serpentine springs 48 which are attached to the primary mass 42. The displacement of the sensing beams 46 caused by the Coriolis force can be measured capacitively to detect any angular input to this gyroscope 40.

The mass ratio between the primary mass 42 and the secondary mass 46 is:

$$\sqrt{\frac{m_1}{4m_2}} \approx \sqrt{\frac{56.04\ \mu g}{4 \times 0.1341\ \mu g}} \approx 10.22$$

Figure 6:
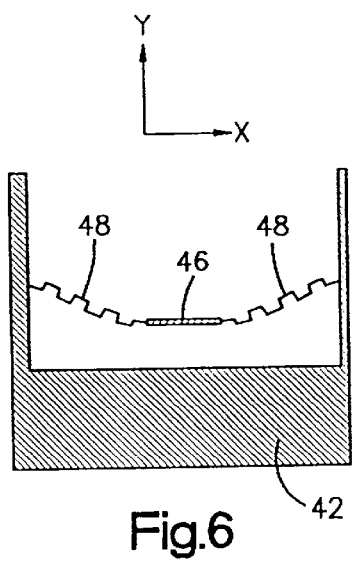
FIG. 6 is a partial view similar to FIG. 5.

The flexures 44 and 48 respectively supporting the primary mass 42 and the secondary mass 46 are tuned in such a way that their stiffness ratio is equal to the mass ratio. Suppose that the gyroscope is driven electrostatically and the magnitude of driven motion is 1 um. Using ANSYS program, the responses of the primary and secondary masses 42 and 46 due to an applied angular velocity of 1°/s are analyzed. FIG. 6 shows a contour view of displacements of the primary and secondary masses 42 and 46 at the resonant frequency.

Figure 7:
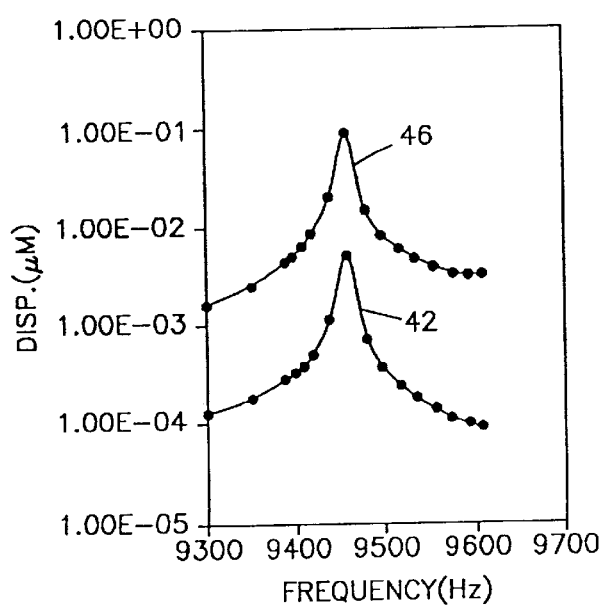
FIG. 7 is a graph showing examples of response amplitudes of primary and secondary masses in accordance with the invention.

The response amplitudes of the two masses 42 and 46 at different driving frequencies are shown in FIG. 7.

From the data obtained, it is known that the ratio between the response amplitude of the two masses at the resonant frequency is:

$$\frac{Y_2}{Y_1} = 10.45$$

which is very close to the mass ratio of 10.22.

In summary, the proposed structural design of a vibratory gyroscope is composed of two interconnected masses, the primary mass and the secondary mass, and the connecting flexures. In such a structural system, the secondary mass is much lighter than the primary mass, and in sensing mode the stiffness ratio between the flexures supporting the primary mass and the flexures supporting the secondary mass is equal to the mass ratio between the primary mass and the secondary mass. When such a gyroscope is excited in its driven motion at the resonant frequency of its sensing motion, the response of the secondary mass will be significantly larger than that of the primary mass for a given angular rate input. The response magnitude ratio between the secondary and primary masses is equal to the square root of the mass ratio between the primary and secondary masses. Therefore, use of the secondary mass as a capacitive sensing element will improve the mechanical sensitivity of the gyroscope. Additionally, the proposed structural design can be used for a general mechanical amplifier. In addition to a gyroscope, the invention can also be extended to improve the performance of other resonant sensor designs such as accelerometers.

We claim:

1. A motion sensor apparatus comprising:
   a primary mass;
   a primary flexure structure supporting said primary mass to experience driven motion against a bias of said primary flexure structure;
   a secondary mass which is less massive than said primary mass; and
   a secondary flexure structure which interconnects said secondary mass with said primary mass and which supports said secondary mass to experience sensing motion relative to said primary mass against a bias of said secondary flexure structure;
   a stiffness ratio between said primary and secondary flexure structures being equal to a mass ratio between said primary and secondary masses.

2. A motion sensor apparatus as defined in claim 1 wherein said primary and secondary masses and said primary and secondary flexure structures are configured such that said sensing motion of said secondary mass will be significantly greater than a primary motion of said primary mass for a given angular rate input to said apparatus when said primary mass is excited in said driven motion at a resonant frequency of said sensing motion.

3. An apparatus as defined in claim 1 wherein said primary and secondary masses and said primary and secondary flexure structures comprise surface micromachined silicon structures.

* * * * *